Patented Sept. 8, 1942

2,294,888

UNITED STATES PATENT OFFICE 2,294,888

PHENOTHIAZINE SUSPENSION

James A. Austin, Kansas City, Mo., assignor to Jensen-Salsbery Laboratories, Inc., Kansas City, Mo., a corporation of Missouri No Drawing. Application August 27, 1940, Serial No. 354,383

3 Claims. (Cl. 167—53)

This invention relates to phenothiazine and is herein disclosed in some detail as a suspension of adsorbed phenothiazine in water suitable for direct administration as a contact insecticide.

Phenothiazine (thio diphenyl amine) has been shown to be highly effective as an anthelmintic in such animals as horses, cattle, sheep, swine, poultry, and possibly others, but has been found difficult to administer because it is both insoluble in water and very difficult to wet. It has, therefore, been administered as an explosive tablet, namely a tablet formed of phenothiazine mixed with sodium bicarbonate and a weak organic acid such as citric or tartaric. The theory is that the tablet takes up water on entering the stomach causing the ingredients to react and disintegrate, scattering the insoluble phenothiazine.

Unless this procedure was followed the phenothiazine tended to lump up and thereby become less efficient.

According to the present invention the foregoing and other difficulties and objections are overcome and a preparation of phenothiazine is provided which may be administered by a dose syringe, or may be diluted with water to form an aqueous suspension carrying any desired proportion of phenothiazine.

In the form disclosed the phenothiazine is adsorbed on the surface of a finely divided colloidally dispersed solid, thus providing a relatively enormous surface of the insecticide free from lumps, thereby presenting a greatly increased surface of the anthelmintic for action against the parasites.

A highly useful commercial material was prepared by stirring 8.25 grams of colloidal bentonite in a small volume of water, stirring until an even suspension was obtained, then adding 1. gram of the wetting agent known as "Aerosol" (sodium dioctylsulfosuccinate) with as little stirring as possible, then adding 100 grams phenothiazine, stirring, then adding water to make 250 grams of mixture, and stirring until an even suspension was obtained.

The resulting material seemed to be an easy flowing aqueous colloidal suspension of bentonite coated with phenothiazine, and carried 40% of the phenothiazine.

It formed stable suspensions when diluted with water, and was well adapted to be administered by a dose syringe. It was highly effective as an anthelmintic. The proportions stated did not seem important but were very convenient.

Equally good results were obtained when the long chain alcohol lauryl sulphonate known as "Duponol P. O." was substituted for the "Aerosol" as a wetting agent.

The same result was obtained when 2 grams of mannitan monolaurate was substituted for the one gram of "Aerosol."

The same results in the form of an easy flowing stable colloidal suspension were obtained when three grams of the colloid known as "Gelloid" (calcium carragheen sulfate) was stirred into 100 grams water, one gram duponol added, and the rest of the first procedure then followed.

Equally good results were obtained when the "Gelloid" was reduced to one gram and the "Aerosol" substituted for the "Duponol." Similar results were obtained when one gram of the "Gelloid" and one gram of mannitan monolaurate were substituted for the three grams "Gelloid" and one gram "Duponol."

Similar results in the form of an easy flowing stable colloidal suspension were also obtained when 1 gram of the colloid known as karaya gum and one gram of "Aerosol" were substituted for the three grams "Gelloid" and one gram "Duponol."

Similar results were obtained with karaya gum when one gram of "Duponol" or two grams mannitan monolaurate were substituted for the "Duponol."

It was found possible to substitute a wetting agent containing a ring compound, such as the sodium-alkyl-naphthalene-sulfonic acid known as "Alkanol."

Having thus described certain embodiments of the invention, what is claimed is:

1. An easy flowing stable colloidal aqueous suspension of phenothiazine including also water, a colloidally dispersed solid in proportion sufficient to stabilize the suspension, and a wetting agent.

2. An easy flowing stable colloidal aqueous suspension of phenothiazine including water, bentonite in proportion sufficient to stabilize the suspension, and a wetting agent.

3. An easy flowing stable colloidal aqueous suspension of phenothiazine including water, bentonite in proportion sufficient to stabilize the suspension, and an aliphatic ester wetting agent.

JAMES A. AUSTIN.